(12) United States Patent
Natter et al.

(10) Patent No.: US 9,391,401 B2
(45) Date of Patent: Jul. 12, 2016

(54) ELECTRICAL CONNECTOR ASSEMBLY (71) Applicant: Lear Corporation, Southfield, MI (US)

(72) Inventors: Brantley Natter, Brighton, MI (US); Paul Castellani, Sterling Heights, MI (US); Slobodan Pavlovic, Novi, MI (US); Juan Lopez, Madison Heights, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/431,137

(22) PCT Filed: Oct. 21, 2013

(86) PCT No.: PCT/US2013/065897
§ 371 (c)(1),
(2) Date: Mar. 25, 2015

(87) PCT Pub. No.: WO2014/063140
PCT Pub. Date: Apr. 24, 2014

(65) Prior Publication Data
US 2015/0249307 A1    Sep. 3, 2015

Related U.S. Application Data

(60) Provisional application No. 61/716,240, filed on Oct. 19, 2012.

(51) Int. Cl.
*H01R 4/50* (2006.01)
*H01R 13/639* (2006.01)
(Continued)

(52) U.S. Cl.
CPC ............ *H01R 13/639* (2013.01); *B60L 3/0069* (2013.01); *B60L 11/1818* (2013.01);
(Continued)

(58) Field of Classification Search
CPC ............. H01R 13/369; H01R 13/6277; H01R 13/6276; B60L 11/818; B60L 11/14
USPC .......................................................... 439/347
See application file for complete search history.

(56) References Cited

U.S. PATENT DOCUMENTS 3,684,321 A * 8/1972 Hundhausen ......... F16L 37/133
285/316
5,402,811 A    4/1995 Weng
(Continued)

FOREIGN PATENT DOCUMENTS

DE    102009043845 A1    3/2011
DE    102011013913 B3    8/2012
WO    2011023514 A1    3/2011

OTHER PUBLICATIONS

PCT International Search Report and Written Opinion, Application No. PCT/US2013/065897 dated Feb. 10, 2014.

*Primary Examiner* — Jean F Duverne
(74) *Attorney, Agent, or Firm* — MacMillan, Sobanski & Todd, LLC (57) ABSTRACT

A connector assembly includes an inlet assembly and a plug assembly. The inlet assembly has a first electrical contact member. A plug assembly has a second electrical contact member. The plug assembly is movable to an inserted engaged position with the inlet assembly such that the first and second electrical contact members engage one another, and a retracted position such the plug assembly is retracted from the inlet assembly. The connector assembly includes an active locking device for retaining the plug assembly in the inlet assembly. A secondary locking device temporarily retains the plug assembly in the inlet assembly prior to activation of the active locking device.

19 Claims, 7 Drawing Sheets

(51) Int. Cl.
*H01R 13/627* (2006.01)
*B60L 3/00* (2006.01)
*B60L 11/18* (2006.01)
*H01R 107/00* (2006.01)

(52) U.S. Cl.
CPC ........ *H01R13/6276* (2013.01); *H01R 13/6277* (2013.01); *B60L 2230/12* (2013.01); *B60L 2270/32* (2013.01); *B60L 2270/34* (2013.01); *H01R 2107/00* (2013.01); *Y02T 10/7005* (2013.01); *Y02T 10/7088* (2013.01); *Y02T 90/121* (2013.01); *Y02T 90/14* (2013.01)

(56) References Cited

U.S. PATENT DOCUMENTS

| | | | |
|---|---|---|---|
| 6,213,672 B1 | 4/2001 | Varga | |
| 7,404,720 B1 | 7/2008 | Frey et al. | |
| 8,025,526 B1 | 9/2011 | Tormey et al. | |
| 8,075,329 B1 | 12/2011 | Janarthanam et al. | |
| 8,172,599 B2 | 5/2012 | Konchan | |
| 8,602,804 B2 * | 12/2013 | Kurumizawa | B60L 11/14 320/109 |
| 8,690,591 B2 * | 4/2014 | Charnesky | B60L 11/1818 191/12.4 |
| 8,708,728 B2 * | 4/2014 | Hirashita | B60L 11/1818 439/304 |
| 2011/0021452 A1 | 1/2011 | Hirofuji et al. | |
| 2011/0070758 A1 | 3/2011 | Poulin et al. | |
| 2011/0171850 A1 | 7/2011 | Brown, II | |
| 2011/0207368 A1 | 8/2011 | Takada et al. | |
| 2011/0300733 A1 * | 12/2011 | Janarthanam | B60L 11/1818 439/304 |
| 2011/0300736 A1 | 12/2011 | Katagiri et al. | |
| 2012/0003861 A1 | 1/2012 | Kwasny et al. | |
| 2012/0171887 A1 | 7/2012 | Sebald et al. | |

\* cited by examiner

ELECTRICAL CONNECTOR ASSEMBLY

CROSS-REFERENCE TO RELATED APPLICATIONS

This application is the National Phase of International Application PCT/US2013/065897 filed Oct. 21, 2013, which designated the U.S. That International Application was published in English under PCT Article 21(2) on Apr. 24, 2014 as International Publication Number WO 2014/063140A1. PCT/US2013/065897 claims the benefit of U.S. Provisional Application No. 61/716,240, filed Oct. 19, 2012. The disclosures of both applications are incorporated herein by reference.

BACKGROUND OF THE INVENTION

This invention relates in general to electrical charging cords. Electrical charging cords are used for electrical vehicles or hybrid vehicles, such as for example, plug-in hybrid vehicles, which are charged by a remote electrical supply. The electrical supply is commonly installed and mounted within a residential garage or may be part of a charging station to provide electrical power for charging batteries of the electric or hybrid vehicle. The charging cord is generally a flexible electrical cable having a vehicle connector on one end and a plug on the other end. The vehicle connector mates with a vehicle inlet to provide electrical communication between the charging cord and the vehicle. The vehicle inlet is in electrical communication with the batteries and other electrical components of the vehicle. The plug mates with a socket outlet of the electrical supply to provide electrical communication between the charging cord and the electrical supply.

SUMMARY OF THE INVENTION

This invention relates to connectors and, in particular, to a vehicle connector assembly. The connector assembly includes an inlet assembly having a first electrical contact member. A plug assembly has a second electrical contact member. The plug assembly is movable to an inserted engaged position with the inlet assembly such that the first and second electrical contact members engage one another, and a retracted position such the plug assembly is retracted from the inlet assembly. The connector assembly includes an active locking device for retaining the plug assembly in the inlet assembly. A secondary locking device temporarily retains the plug assembly in the inlet assembly prior to activation of the active locking device.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
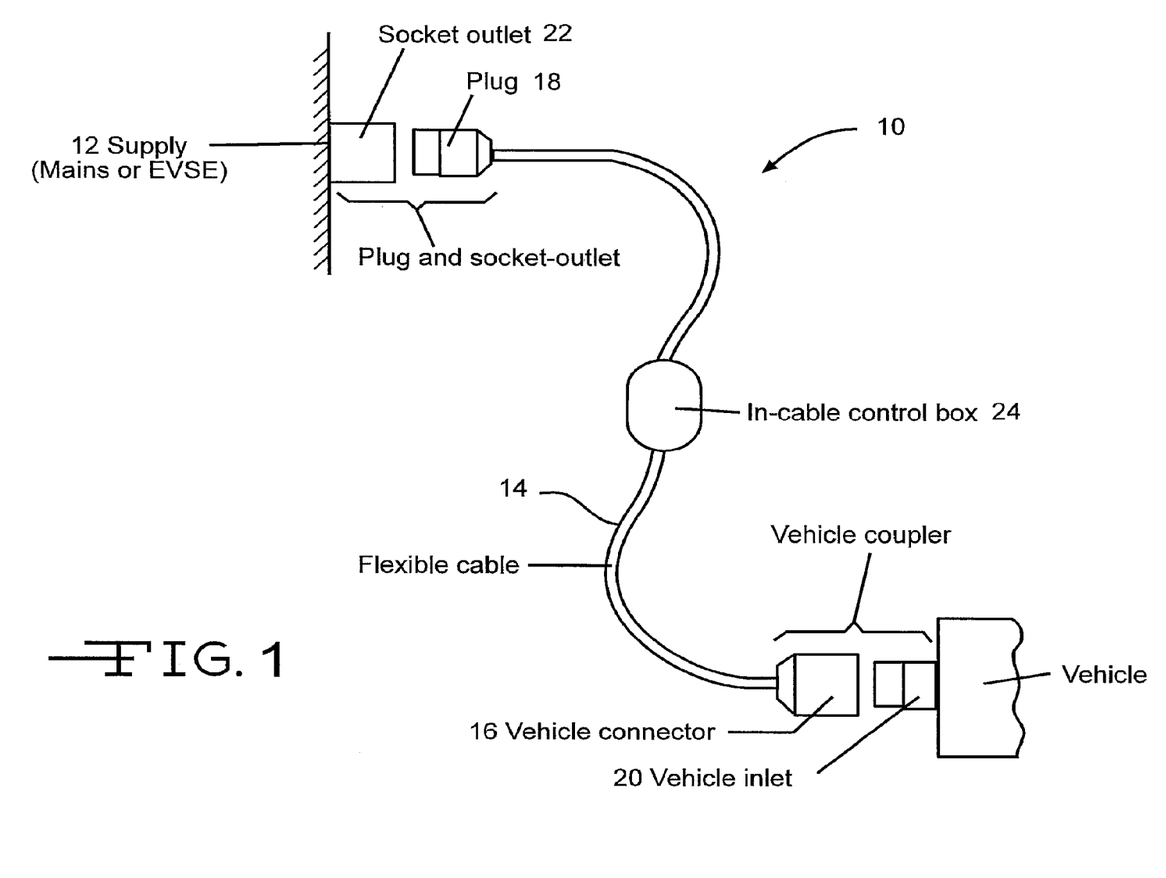
FIG. 1 is a schematic view of an electrical charging cord assembly which may incorporate one of the connector assemblies of the present invention.

There is illustrated in FIG. 1 an electrical charging cord assembly, indicated generally at 10. The electrical charging cord assembly 10 may be used for electrical vehicles or hybrid vehicles (e.g., plug-in hybrid) which are charged by a remote electrical supply 12. For example, the electrical supply 12 may be installed and mounted within a residential garage or may be part of a charging station to provide electrical power for charging batteries of the electric or hybrid vehicle. The batteries within the vehicle may receive and store electrical energy from the external electrical supply 12. The electrical charging cord assembly 10 includes a charging cord, indicated generally at 14. The charging cord 14 is a flexible electrical cable having a vehicle connector 16 on one end and a plug 18 on the other end. The vehicle connector 16 mates with a vehicle inlet 20 to provide electrical communication between the charging cord 14 and the vehicle. The vehicle inlet 20 is in electrical communication with the batteries and other electrical components of the vehicle. The plug 18 mates with a socket outlet 22 of the electrical supply 12 to provide electrical communication between the charging cord 14 and the electrical supply 12.

The charging cord 14 may also include an in-cable control box 24 connected between the ends of the charging cord 14. The control box 24 may house various electrical components for controlling and regulating various aspects of the electrical current or voltage traveling through the charging cord 14. For example, the control box 24 may include features such as ground fault protection and monitoring, charger circuit interrupt devices, and indicator lights.

Figure 2:
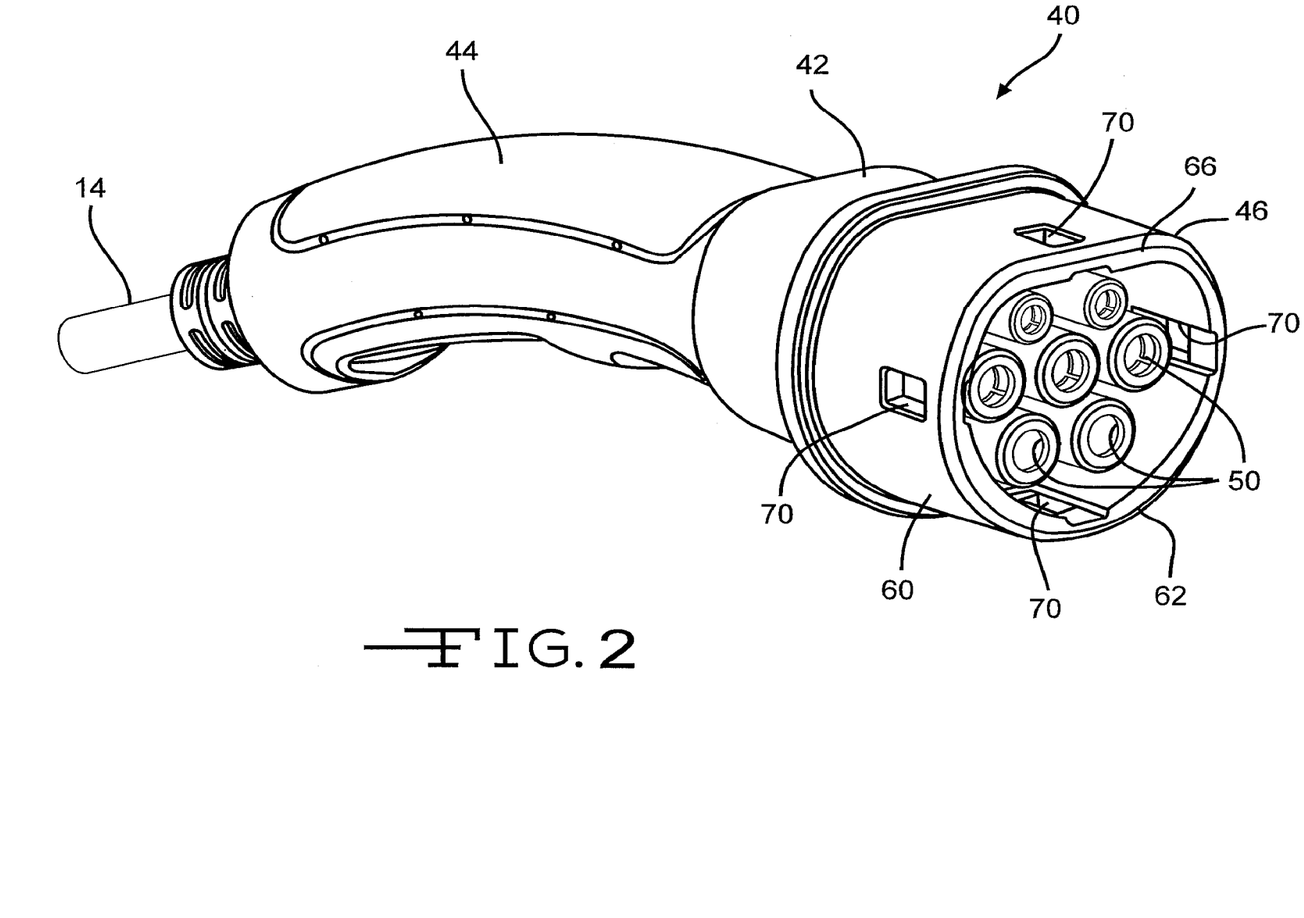
FIG. 2 is a perspective view of a vehicle connector assembly.

There is illustrated in FIG. 2 a vehicle connector assembly (plug assembly), indicated generally at 40. The connector assembly 40 is an example of a connector which may be used as the vehicle connector 16 in the charging cord assembly 10 illustrated in FIG. 1. The connector assembly 40 includes a housing 42 defining a handle portion 44 and a connector portion 46. Extending from the end of the handle portion 44 is a wire, such as the charging cord 14. The connector portion 46 includes a plurality of electrical contact tubes or connection ports 50. In the embodiment illustrated in FIG. 2, the connector portion includes seven ports 50. It should be understood that the connector assembly 40 can have any suitable number of ports 50. Each port 50 includes an electrical terminal therein which connects to and engages with a corresponding conductor pin of a vehicle inlet. The terminals can be connected to wires (not shown) separately run within the wire 14. The selective engagement of the terminals and pins provide electrical communication therebetween. The terminals can be any suitable device which provides for a removable connection with the corresponding mating pins.

The connector portion 46 includes a tubular portion 60 defining a circumferential wall 62 extending from the end of the vehicle connector assembly 40. The ports 50 are disposed within the interior of the tubular portion 60. The wall 62 has a rounded shape with a flat portion 66 so that the connector portion 46 can be installed in the proper orientation with respect to a vehicle inlet having a corresponding shape as the circumferential wall 62. The wall includes a plurality of windows or apertures 70 formed therethrough. In the embodiment illustrated in FIG. 2, there are four apertures circumferentially spaced from one another along the circumferential wall 62.

Figure 3:
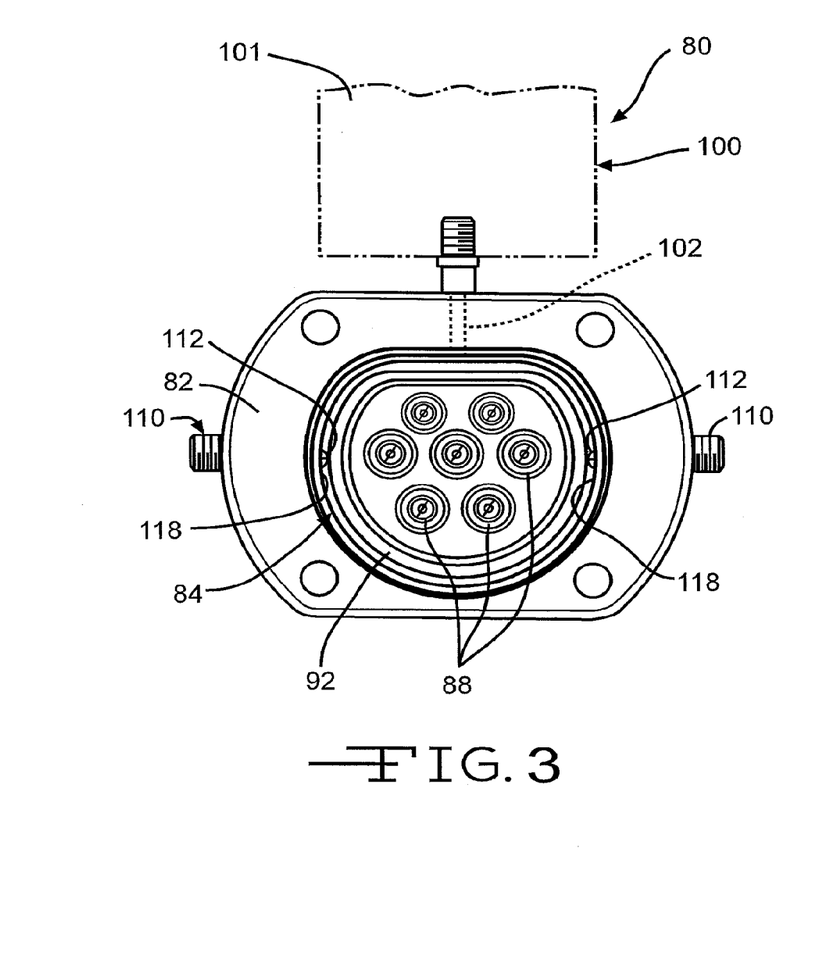
FIG. 3 is a front elevational view of a vehicle inlet assembly, wherein an active locking device is unactuated.

There is illustrated in FIG. 3 a vehicle socket or inlet assembly, indicated generally at 80. The inlet assembly 80 is an example of an inlet which may be used as the vehicle inlet 20 in the charging cord assembly 10 illustrated in FIG. 1. The inlet assembly 80 is suited for mounting on the vehicle, and preferably at a location for easy access by a user of the charging cord assembly 10. The inlet assembly 80 includes a housing 82 having a connector portion 84. The connector portion 84 includes a plurality of conductors or pins 88 for mating with the terminals of the ports 50 of the connector assembly 40. Each of the pins 88 is in electrical communication with various electrical components of the vehicle such as for example, to provide charging of vehicle batteries from a power supply.

Figure 4:
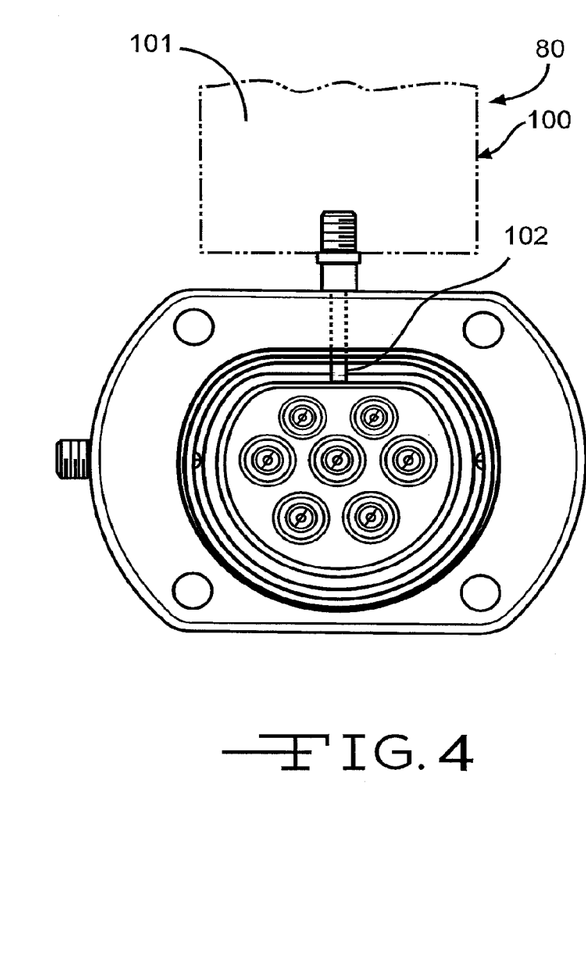
FIG. 4 is a front elevational view of the vehicle inlet assembly of FIG. 3, wherein the active locking device is actuated.

The connector portion 84 includes a recess 92 for receiving the circumferential wall 62 of the connector assembly 40. The recess 92 preferably has a corresponding shape as the circumferential wall 62. The inlet assembly 80 preferably has at least one active locking device, indicated generally at 100. The active locking device 100 is mounted in the location of one of the apertures 70. In the embodiment illustrated in FIGS. 3 and 4, the active locking device 100 is associated with an upper aperture 70 adjacent the flat portion 66. The active locking device 100 includes a retractable arm 102 that is movable between a retracted position, as shown in FIG. 3, and an extended position, as shown in FIG. 4. In the retracted position, the arm 102 is retracted from within the recess 92 such that the connector assembly 40 can be freely inserted and removed from the inlet assembly 80. In the extended position, the arm 102 is disposed within the recess 92 and is inserted within the aperture 70, thereby preventing the connector assembly 40 from being removed from the inlet assembly 80 after the circumferential wall 62 has been inserted into the recess 92. The active locking device 100 may maintain this locking position until controlled to move the arm 102 into its retracted position. The active locking device 100 can include any suitable mechanism or actuator 101 which controls the motion of the arm 102. For example, the actuator 101 of the active locking device 100 can be solenoid actuated or can be motorized. Various sensors may be incorporated into connector assembly 40, the inlet assembly 80, or electrically connected to the pins 88 to determine when the connector assembly 40 is inserted into the inlet assembly 80.

Because it might take a moment of time for the active locking device 100 to detect and then move the arm 102 from the retracted position to the extended position, it is desirable to have a secondary locking device for temporarily retaining the connector assembly 40 in the inlet assembly 80 prior to activation of the active locking device 100. In the embodiment illustrated in FIGS. 3 and 4, the inlet assembly 80 includes a pair of secondary locking devices, indicated generally at 110, located on opposite sides of the recess 92. The secondary locking devices 110 help prevent the connector assembly 40 from being inadvertently pulled out from the inlet assembly 80 during operation of the active locking device 100 into its locking position, e.g., the arm 102 being moved to its extending position. This is also particularly helpful if the charging cord 14 is mounted on a retracting device (not shown) that coils up the wire 14 and imparts a pulling force on the connector assembly 40 from the inlet assembly 80. Preferably, the secondary locking devices 110 are passively activated such that the user only needs to insert the connector assembly 40 into the inlet assembly 80 to activate the secondary locking device. The connector assembly 40 can be removed from the inlet assembly by sufficiently pulling on the connector assembly 40 via the handle portion 44 in a direction away from the inlet assembly 80 to disengage the secondary locking devices 110.

Figures 5, 6:
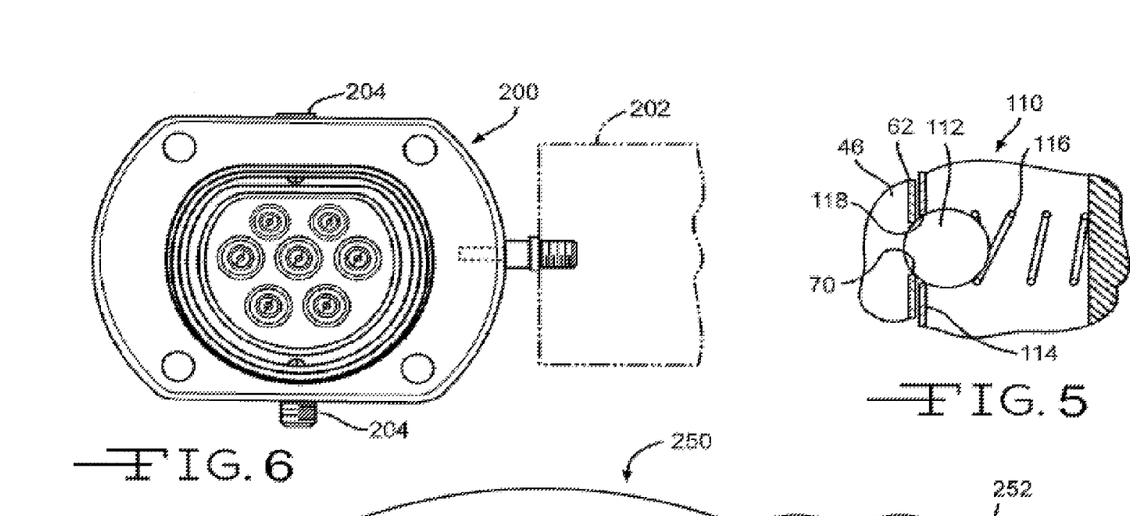
FIG. 5 is a schematic partial cross-sectional view of a passive locking device of the vehicle inlet assembly of FIG. 3.
FIG. 6 is a front elevational view of a second embodiment of a vehicle inlet assembly, wherein the active locking device is located on the side of the vehicle inlet assembly.

There is schematically represented in FIG. 5 one example of the secondary locking device 110. The secondary locking device 110 is in the form or ball detent locking mechanism. The secondary locking device 110 includes a ball 112 (or any other suitable locking engagement member) which is biased against a wall 114 of the inlet assembly at an outer edge of the recess 92 by a spring 116. The ball 112 is partially disposed in an opening 118 formed in the wall 114. The openings 118 and secondary locking devices 110 are located at one or more locations about the recess 92 which are adjacent to the apertures 70 of the connector portion 46 when the connector assembly 40 is inserted into the inlet assembly 80. The diameter of the ball 112 is larger than the diameter or width of the opening 118 such that only a portion of the ball 112 extends into the recess 92. When the connector assembly 40 is fully inserted into the inlet assembly 80 (the circumferential wall 62 extends into the recess 92), a portion of the ball 112 will extend through the corresponding aperture 70 of the connector portion 46 of the connector assembly 40, thereby securing the connector assembly 40 relative to the inlet assembly 80. During insertion, the ball 112 retracts against the bias of the spring 116 to permit movement of the circumferential wall 62 into the recess 92. Once the aperture 70 lines up with the opening 118, the ball 112 is moved to its locked position, as shown in FIG. 5, by the force of the spring 116. To remove the connector assembly 40 from the inlet assembly 80, the user pulls on the handle portion of the connector assembly 40 to overcome the force of the spring 116 the ball 112 back out of the opening 118 to permit the circumferential wall 62 to slide out of the recess 92.

There is illustrated in FIG. 6 a second embodiment of an inlet assembly, indicated generally at 200. The inlet assembly 200 is similar to the inlet assembly 80. One of the differences is that an active locking device 202 is located at a different location compared to the inlet assembly 80. The active locking device 202 is located at one of the sides of the inlet assembly 200. In this configuration, a pair of secondary locking devices 204 are located by two of the three open (unused) apertures of the connector assembly. If two secondary locking devices are used, it is preferred to locate them across from one another which assists in securing the connector assembly to the inlet assembly.

Figure 7:
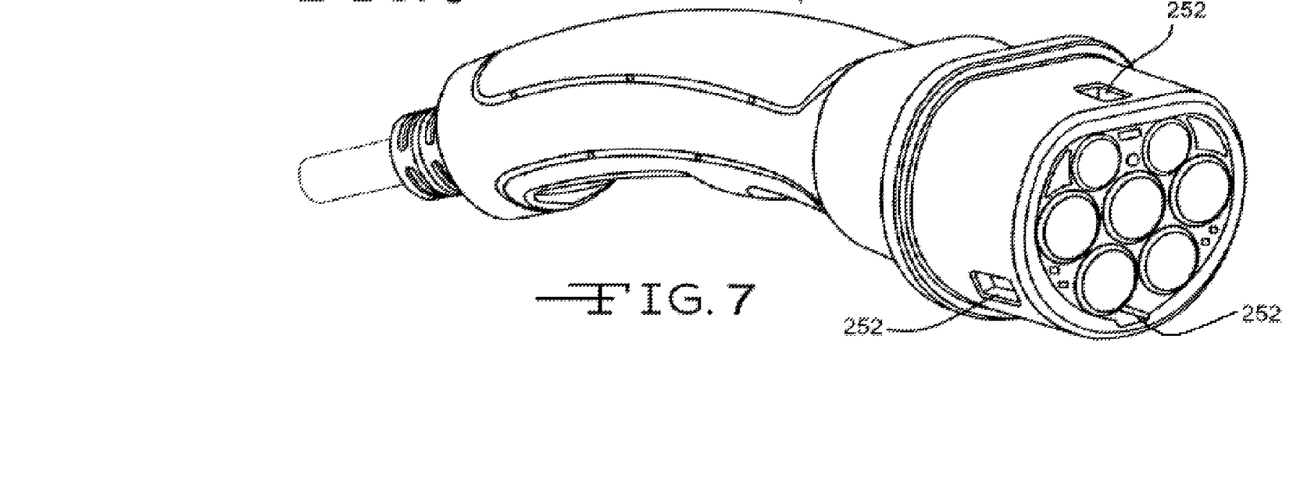
FIG. 7 is a perspective view of a plug assembly.

There is illustrated in FIG. 7 a second embodiment of a connector assembly, indicated generally at 250. The connector assembly 250 is an example of a connector which may be used as the plug 18 (or the vehicle connector 16) in the charging cord assembly 10 illustrated in FIG. 1. The connector assembly 250 is similar in structure and function as the connector assembly 40. Note that the connector assembly 250 has three apertures 252 instead of the four apertures 70 of the connector assembly 40. The connector assembly 250 along with a corresponding inlet assembly (not shown) may incorporate the active locking devices and secondary locking devices as shown and described herein.

Figure 8:
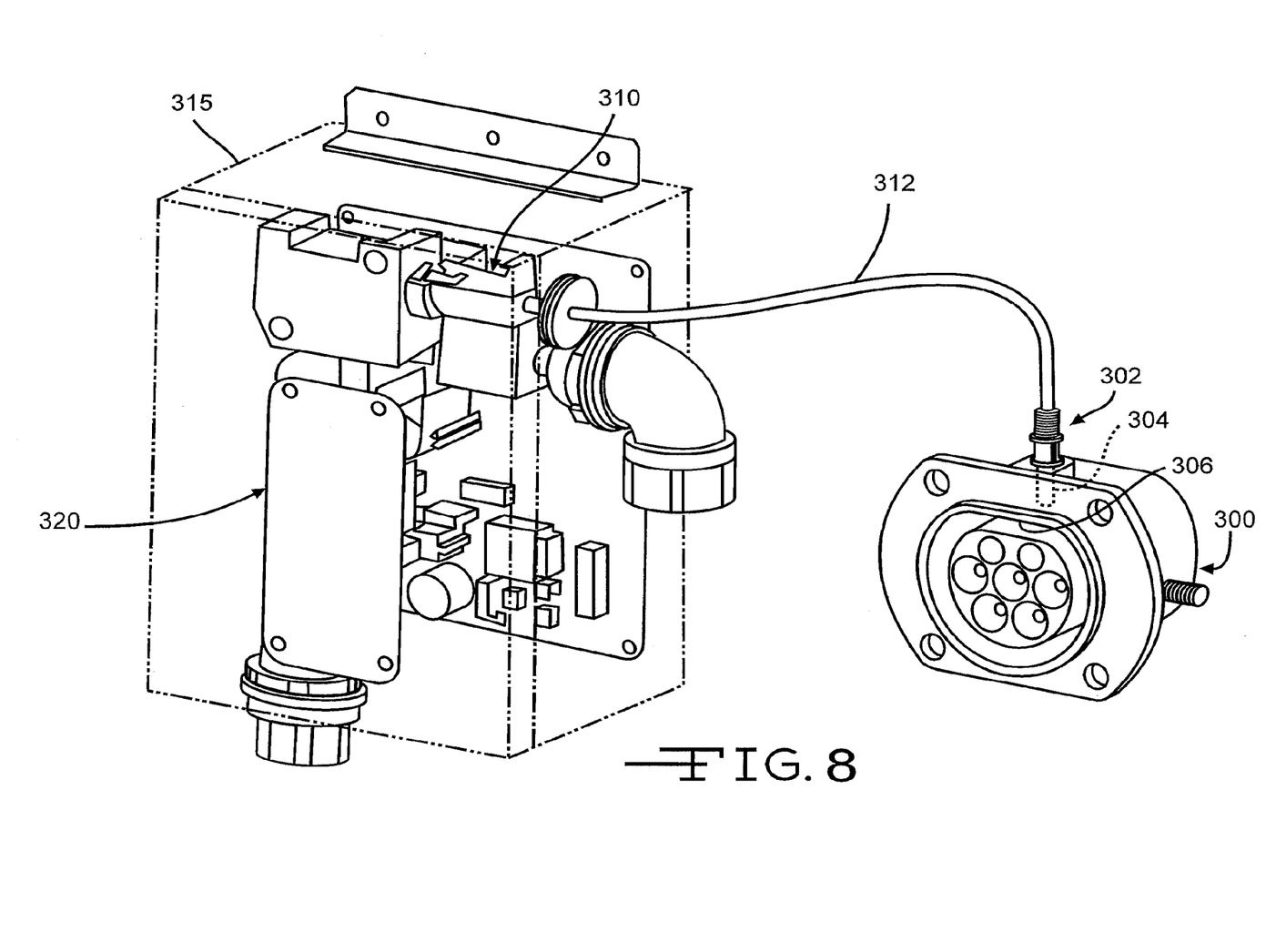
FIG. 8 is a perspective view of a third embodiment of a vehicle inlet assembly having an active locking device remotely located within a sealed compartment.

There is illustrated in FIG. 8, a third embodiment of an inlet assembly, indicated generally at 300. The inlet assembly 300 is similar in structure and function as the inlet assembly 80 and may include secondary locking devices as shown and described herein. The inlet assembly 300 includes an active locking device, indicated generally at 302. Similar to the active locking device 100, the active locking device 302 includes an arm 304 which is movable between a retracted and extended position relative to a recess 306 of the inlet assembly 300. One of the differences is that the active locking device 302 includes an actuator 310 which is located remotely from the arm 304. As one example, the actuator 310 can be a linear drive mechanism using a Bowden cable 312 to move the arm 304. The Bowden cable 312 can include an inner wire that is connected to the arm 304. The inner wire is pushed or pulled through an outer sleeve of the Bowden cable 312 to facilitate movement of the arm 304. This configuration of a remotely located actuator 310 has packaging advantages such that the inlet assembly 300 may be installed at a desired location on the vehicle without having to provide for a relative large space for an actuator directly mounted on the inlet assembly 300. Another advantage is that the actuator 310 may be located within a compartment or sealed enclosure 315 mounted in the vehicle. The compartment or enclosure 315 may also contain other vehicle components 320 housed therein. Often, actuators are provided (manufactured) without sealed housings so locating the actuator remotely within a sealed enclosure provides the opportunity to use less expensive unsealed actuators instead of having to modify or manufacture a sealed actuator assembly that is attached directly to inlet assembly.

It should be understood that the connection between the actuator 310 and the arm 304 need not be a cable and may be any suitable mechanism, such as a rigid linkage connection.

Instead of being located in a sealed enclosure 315, the actuator 310 may be located in the passenger compartment or other areas of the vehicle which are not subjected to the outside environment.

Although the remote location feature of the actuator was described with respect to the inlet assembly mounted on the car, it should be understood that this could also be used for the socket outlet 18 and the supply 12.

Figure 9:
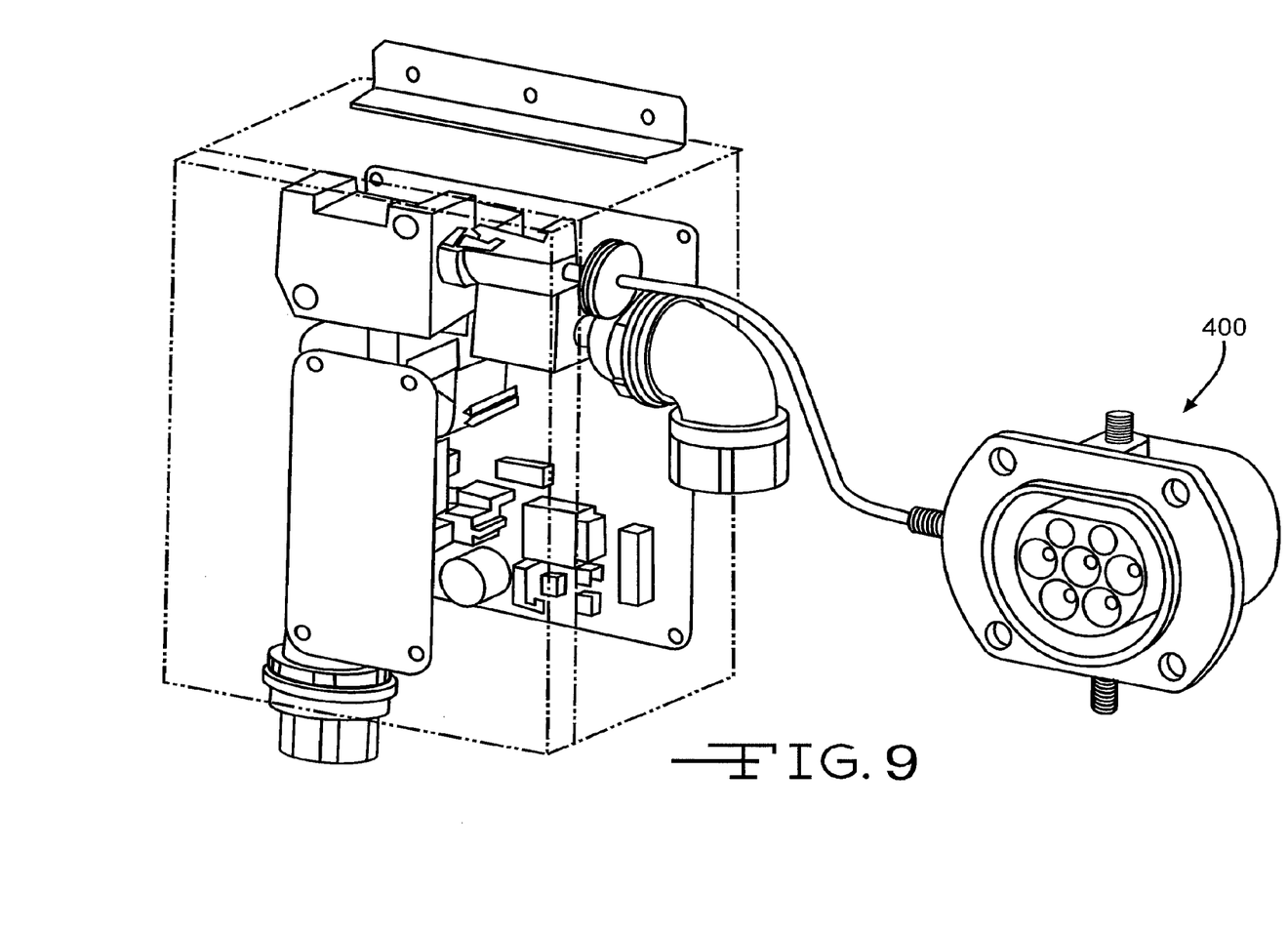
FIG. 9 is a perspective view of a fourth embodiment of a vehicle inlet assembly having an active locking device remotely located within a sealed compartment.

FIG. 9 illustrates a fourth embodiment of an inlet assembly 400 having an actuator of an active locking device remotely located within a sealed compartment, but wherein the arm is located at the side of the inlet assembly instead of on the top (as is the configuration of the inlet assembly 300 shown in FIG. 8).

Figure 10:
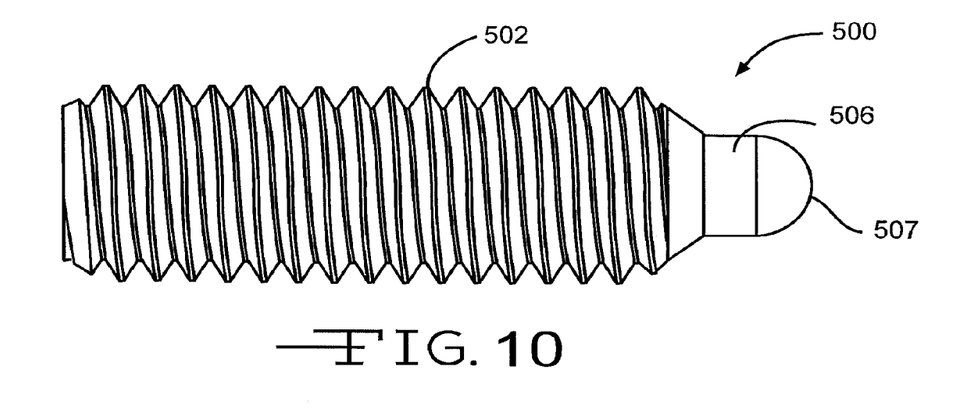
FIG. 10 is a side elevational view of a second embodiment of a secondary locking device.
Figure 11:
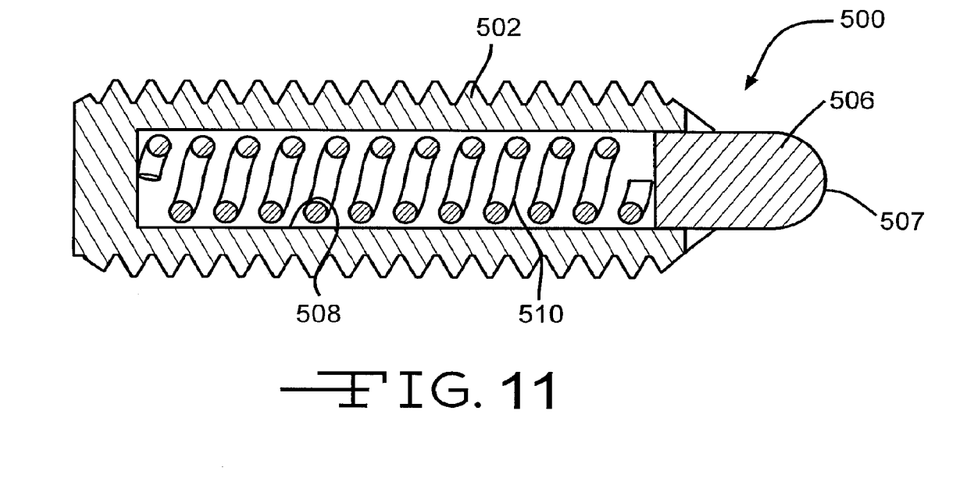
FIG. 11 is a cross-sectional view of the secondary locking device of FIG. 10.

There is illustrated in FIGS. 10 and 11 a second embodiment of a secondary locking device, indicated generally at 500. The secondary locking device 500 includes a housing 502 having external threads formed thereon. The housing 502 can be threaded into corresponding threaded holes formed in the respective inlet assembly to locate and mount the secondary locking device 500. The secondary locking device 500 includes a pin or detent member 506 which is movably mounted within a bore 508 formed in the housing 502. The detent member 506 may have a rounded end 507 to function is a similar manner as the ball 112. A spring 510 is disposed in the bore 508 and biases the detent member 506 in an outwardly direction from the housing 502. The secondary locking device 500 can be configured such that the detent member 506 cannot extend too far forward (or fall out) from the bore 508 and is located at a predetermined position relative to the housing 502. The threads of the housing 502 also permit the secondary locking device 500 to be properly positioned and adjusted relative to the recess of the inlet assembly by simply threading the secondary locking device 500 to its desired location (the rounded end of the detent member 506 extending into the recess 92).

During insertion of the connector assembly in the inlet assembly, the detent member 506 retracts against the bias of the spring 510 to permit movement of the circumferential wall 62 into the recess 92. Once the aperture 70 moves into the path of the detent member 506, the detent member 506 is moved to its extended locked position by the force of the spring 510. To remove the connector assembly 40 from the inlet assembly 80, the user pulls on the handle portion of the connector assembly 40 to overcome the force of the spring 510 moving the detent member 506 partially into the bore 508 to permit the circumferential wall 62 to slide out of the recess 92.

The principle and mode of operation of this invention have been explained and illustrated in its preferred embodiments. However, it must be understood that this invention may be practiced otherwise than as specifically explained and illustrated without departing from its spirit or scope.

What is claimed is:

1. An assembly comprising:
   an inlet assembly having a first electrical contact member;
   a connector assembly having a second electrical contact member, wherein the connector assembly is movable relative to the inlet assembly between an inserted position, wherein the first and second electrical contact members engage one another, and a removed position, wherein the first and second electrical contact members do not engage one another;
   an active locking device for retaining the connector assembly in the inserted position; and
   a secondary locking device for temporarily retaining the connector assembly in the inserted position prior to the active locking device retaining the connector assembly in the inserted position.

2. The assembly of claim 1, wherein the active locking device includes retractable arm that is movably mounted relative to the inlet assembly between a retracted position and an extended position within an aperture formed in a housing of the connector assembly, thereby retaining the connector assembly in the inlet assembly.

3. The assembly of claim 2, wherein the active locking device includes an actuator which moves the pin between the retracted and extended positions.

4. The assembly of claim 3, wherein the actuator includes an electrical solenoid.

5. The assembly of claim 3, wherein the actuator is mounted remotely from the inlet assembly.

6. The assembly of claim 5, wherein the actuator includes a linear drive mechanism and a Bowden cable.

7. The assembly of claim 6, wherein the actuator is mounted in a sealed enclosure.

8. The assembly of claim 1, wherein the secondary locking device includes a detent member movably mounted relative to the inlet assembly between a locked position within an aperture formed in the connector assembly, and an unlocked position such that the detent member is withdrawn from the aperture.

9. The assembly of claim 8, wherein the detent member is biased by a spring towards the locked position.

10. The assembly of claim 9, wherein the detent member is a ball.

11. The assembly of claim 9, wherein the detent member is a pin having a rounded head.

12. The assembly of claim 8, wherein the detent member is slidably mounted in a housing which is mounted on the inlet assembly.

13. The assembly of claim 12, wherein the housing is threadably attached to the inlet assembly.

14. The assembly of claim 13, wherein the housing is cylindrical having threads formed on an outer surface thereof, and wherein the housing is threadably mounted into a threaded bore formed in the inlet assembly such that the position of the housing may be adjusted relative to the inlet assembly.

15. The assembly of claim 8, wherein the detent member is adjustably mounted on the inlet assembly.

16. An assembly comprising:
   an inlet assembly having a first electrical contact member;
   a connector assembly having a second electrical contact member, wherein the connector assembly is movable relative to the inlet assembly between an inserted position, wherein the first and second electrical contact members engage one another, and a removed position, wherein the first and second electrical contact members do not engage one another;
   an actively actuated locking device for retaining the connector assembly in the inserted position; and
   a passively actuated locking device for retaining the connector assembly in the inserted position.

17. The assembly of claim 16 wherein the passively actuated locking device retains the connector assembly in the inserted position before the actively actuated locking device retains the connector assembly in the inserted position.

18. The assembly of claim 16 wherein the passively actuated locking device retains the connector assembly in the inserted position after the actively actuated locking device ceases to retain the connector assembly in the inserted position.

19. The assembly of claim 16 wherein the passively actuated locking device retains the connector assembly in the inserted position before the actively actuated locking device retains the connector assembly in the inserted position, and wherein the passively actuated locking device retains the connector assembly in the inserted position after the actively actuated locking device ceases to retain the connector assembly in the inserted position.

\* \* \* \* \*